(12) United States Patent
Wolkersdorfer

(10) Patent No.: US 7,467,821 B2
(45) Date of Patent: Dec. 23, 2008

(54) VEHICLE BODY STRUCTURE FOR A PASSENGER CAR EQUIPPED WITH A FASTBACK

(75) Inventor: Werner Wolkersdorfer, Neuhausen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 306 days.

(21) Appl. No.: 11/377,441

(22) Filed: Mar. 17, 2006

(65) Prior Publication Data

US 2008/0007095 A1 Jan. 10, 2008

(30) Foreign Application Priority Data

Mar. 18, 2005 (DE) .................. 10 2005 012 543

(51) Int. Cl.
B62D 25/08 (2006.01)

(52) U.S. Cl. .................. 296/203.04; 296/198

(58) Field of Classification Search ............ 296/203.04, 296/203.03, 198, 193.08, 193.05
See application file for complete search history.

(56) References Cited

U.S. PATENT DOCUMENTS

| 2,896,997 | A | 7/1959 | Garcia et al. |
| 4,234,225 | A | 11/1980 | Harasaki et al. |
| 4,408,794 | A | 10/1983 | Harasaki |
| 5,102,186 | A | 4/1992 | Yoshii et al. |
| 5,123,696 | A | 6/1992 | Watari |
| 5,246,263 | A | 9/1993 | Tanaka et al. |
| 6,808,228 | B1 | 10/2004 | Campbell et al. |

FOREIGN PATENT DOCUMENTS

| DE | 24 32 238 B2 | 1/1976 |
| DE | 29 31 467 C2 | 2/1980 |
| DE | 100 36 399 A1 | 2/2002 |
| FR | 2 718 408 A1 | 10/1995 |
| JP | 58-63577 A | 4/1983 |
| JP | 2002-68017 A | 3/2002 |

OTHER PUBLICATIONS

European Search Report dated Jun. 13, 2006 including English Translation of relevant portion (Five (5) pages).

*Primary Examiner*—Joseph D Pape
(74) *Attorney, Agent, or Firm*—Crowell & Moring LLP

(57) ABSTRACT

A vehicle body structure for a passenger car equipped with a fastback has oppositely arranged lateral roof frames, rearward side parts and rearward spring strut receiving devices. The oppositely arranged lateral roof frames are each constructed as a hollow support and are being mutually locally connected by transversely extending members. In order to reduce the roof intrusion of the vehicle body structure in the event of a rollover and furthermore increase the torsional resistance, each lateral roof frame in the area of the rearward spring strut receiving devices is additionally connected by way of a hollow support structure which extends in the transverse direction of the vehicle to the adjacent spring strut receiving device situated underneath.

10 Claims, 5 Drawing Sheets

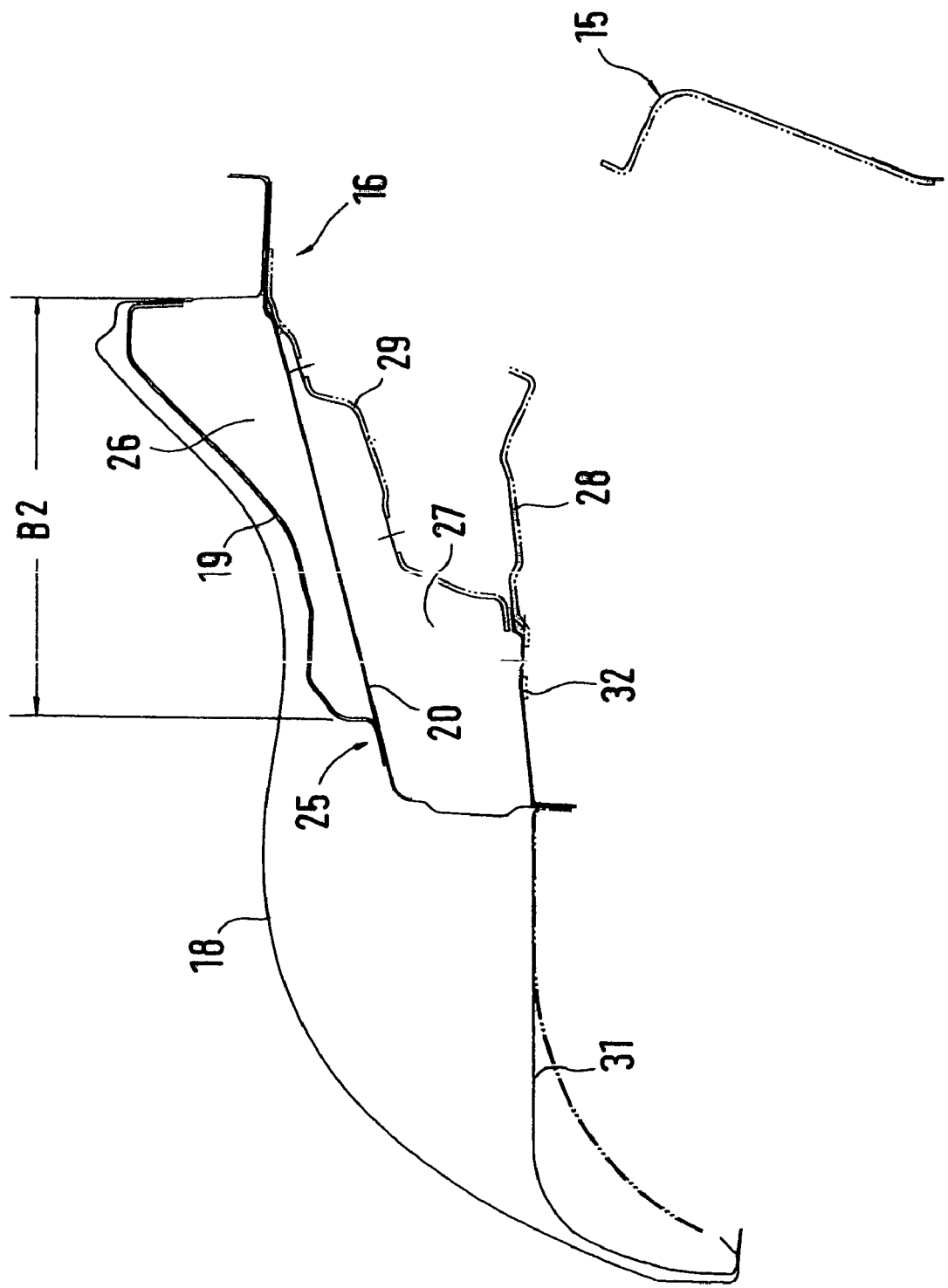

VEHICLE BODY STRUCTURE FOR A PASSENGER CAR EQUIPPED WITH A FASTBACK

CROSS REFERENCE TO RELATED APPLICATIONS

This application claims the priority of 10 2005 012 543.3, filed in Germany on Mar. 18, 2005, the disclosure(s) of which is (are) expressly incorporated by reference herein.

BACKGROUND AND SUMMARY OF THE INVENTION

The present invention relates to a vehicle body structure for a passenger car equipped with a fastback, and more particular, to a passenger car body structure having lateral roof frames, rearward side parts and rearward spring strut receiving devices, the oppositely arranged lateral roof frames each constructed in the manner of a hollow support being mutually locally connected by way of transversely extending members.

In a known vehicle body structure for a passenger car equipped with a fastback, the two lateral roof frames in the rear area behind the two side doors are linked to the vehicle body structure situated underneath only by means of the rear side parts.

An object of the present invention is to provide a vehicle body structure for a passenger car equipped with a fastback such that the roof intrusion in the event of a rollover is reduced and furthermore the torsional resistance of the passenger car is increased.

According to the invention, this object has been achieved by providing that each lateral roof frame in the area of the rearward spring strut receiving devices is additionally connected by way of a hollow support structure extending in the transverse direction of the vehicle to the adjacent spring strut receiving device situated underneath.

Among the principal advantages achieved with the present invention are that, as a result of the additional support of the two lateral roof frames in the area of the rear spring strut receiving devices by way of hollow support structures extending in the transverse direction of the vehicle, on one hand, the roof intrusion in the event of a vehicle rollover is clearly reduced and furthermore the torsional resistance of the vehicle is increased.

Over a significant portion of their longitudinal dimension, the lateral roof frames have a three-shell construction such that two hollow supports are formed which are arranged above one another and are closed in a cross-sectional view. At least in the rear area of the side doors and in the adjoining area, the center reinforcement of the lateral roof frame, in the top view, has an approximately L-shaped construction. The reinforcement, together with the side part situated underneath, forms a first top hollow support of a hollow support structure whose short leg extends in the transverse direction of the vehicle and, with its free end, points toward the outside in the direction of the exterior side of the vehicle. The L-shaped reinforcement and the side part, in areas, virtually form a hockey-stick-shaped hollow support. A second lower-positioned hollow support extends below the short transversely extending leg and forms a shoe-type console which is connected to the side part on the inside and to an upper wall of the spring strut receiving device.

As a result of the hollow support structure according to the present invention, the lateral roof frame is connected in the rear area in a force-transmitting manner to the vehicle body structure situated underneath. Thereby, a particularly effective support is achieved in the event of a vehicle rollover.

Other objects, advantages and novel features of the present invention will become apparent from the following detailed description of the invention when considered in conjunction with the accompanying drawings.

BRIEF DESCRIPTION OF THE DRAWINGS

FIG. 6 is an enlarged cross-sectional view along line VI-VI of FIG. 2.

DETAILED DESCRIPTION OF THE DRAWINGS

Figure 1:
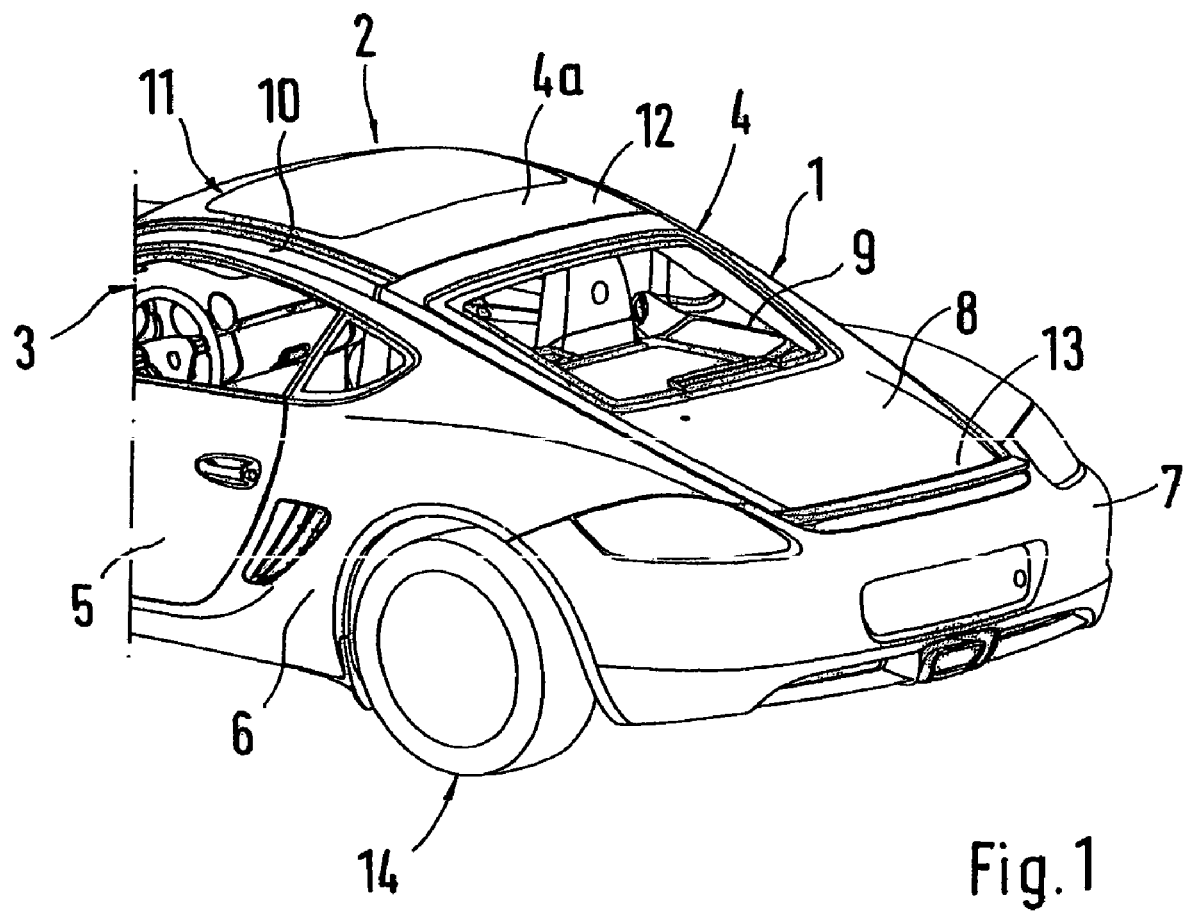
FIG. 1 is a partial perspective view of a passenger car diagonally from the rear.

A passenger car designated generally by numeral 2 equipped with a fastback 1 has a body structure 3 which, in the illustrated area, has a roof 4, side doors 5, rear side parts 6 and a rear end part 7. In the illustrated exemplary embodiment, the roof 4 is composed of a forward fixed roof section 4*a* and of a rearward swivellable flap 8. A sliding roof or a removable roof part can be provided in the area of the roof section 4*a*. The swivellable flap 8 comprises a forwardly directed rear window 9 and an adjoining rigid flap section. Instead of the swivellable flap 8, a stationary rear window 9 alone can also be alternatively provided.

One elongated lateral roof frame 10 respectively extends along the roof 4 on each longitudinal side of the fastback-type passenger car 2. The oppositely arranged lateral roof frames 10, each constructed in the manner of a hollow support, are locally mutually connected by transversely extending members 11, 12, 13.

The lateral roof frames 10 are mutually connected by way of a transversely extending member 11 arranged at the forward edge of the roof 4, a transversely extending member 12 extending between the rearward edge of the roof section 4*a* or the adjoining flap 8, a transversely extending member 13 provided in the area of a reward back wall. Both lateral roof frames 10 extend from an upper area of upright forward hinge columns continuously to the rearward transversely extending member 13.

In the area of the rear wheels 14, rearward spring strut receiving devices 15 are in each case provided on the rearward side part 6 of the vehicle body structure 3 on the interior side. The spring strut receiving devices 15 can be connected with one another by another transversely extending member (not shown).

Figure 2:
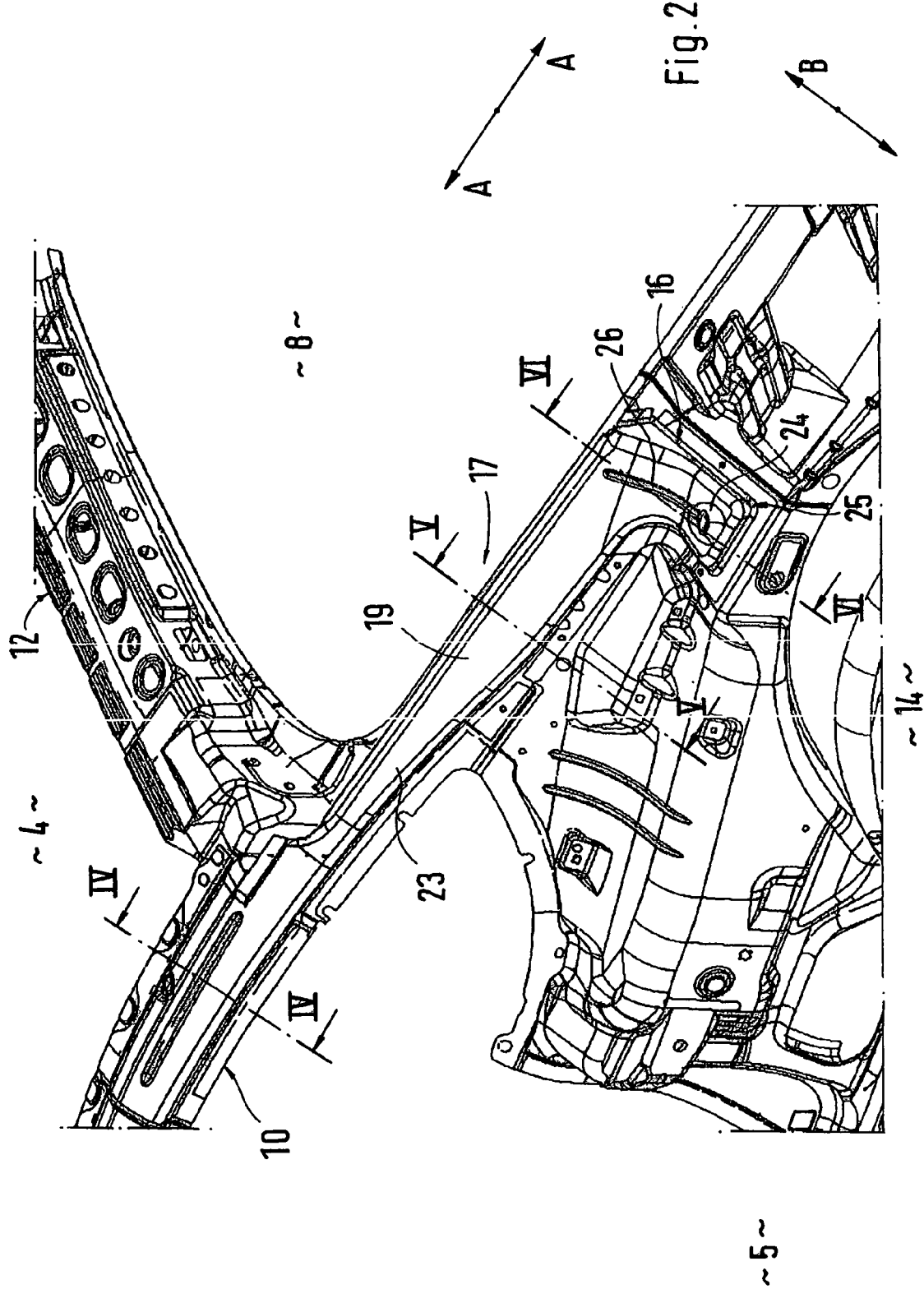
FIG. 2 is a partial perspective view diagonally from the vehicle rear onto a lateral area of the vehicle body structure without the outside side part.
Figure 4:
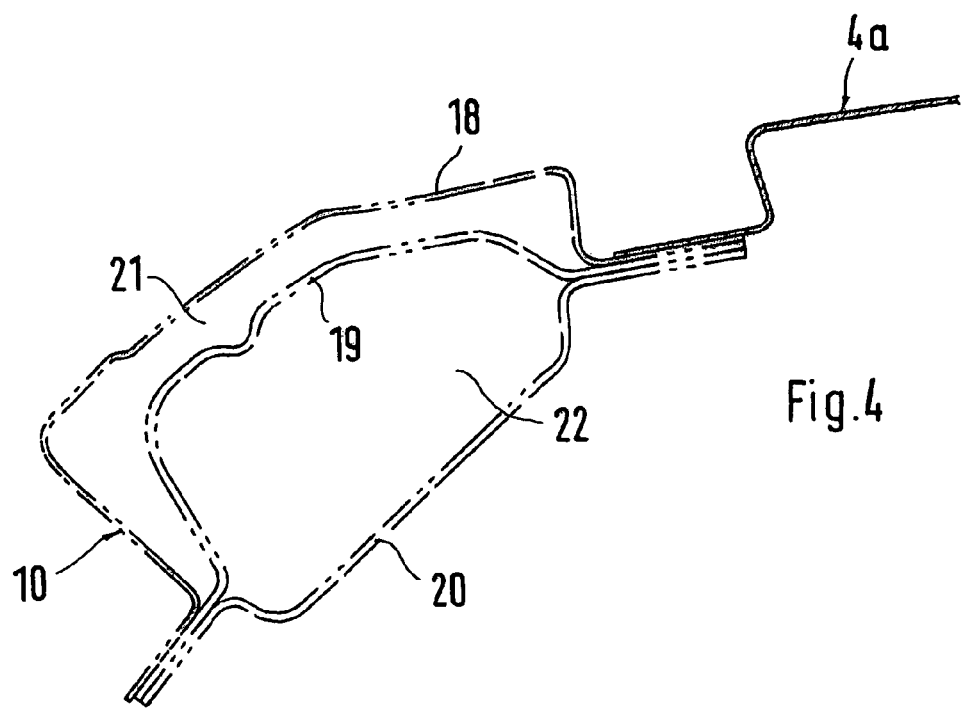
FIG. 4 is an enlarged cross-sectional view along line IV-IV of FIG. 2.
Figure 5:
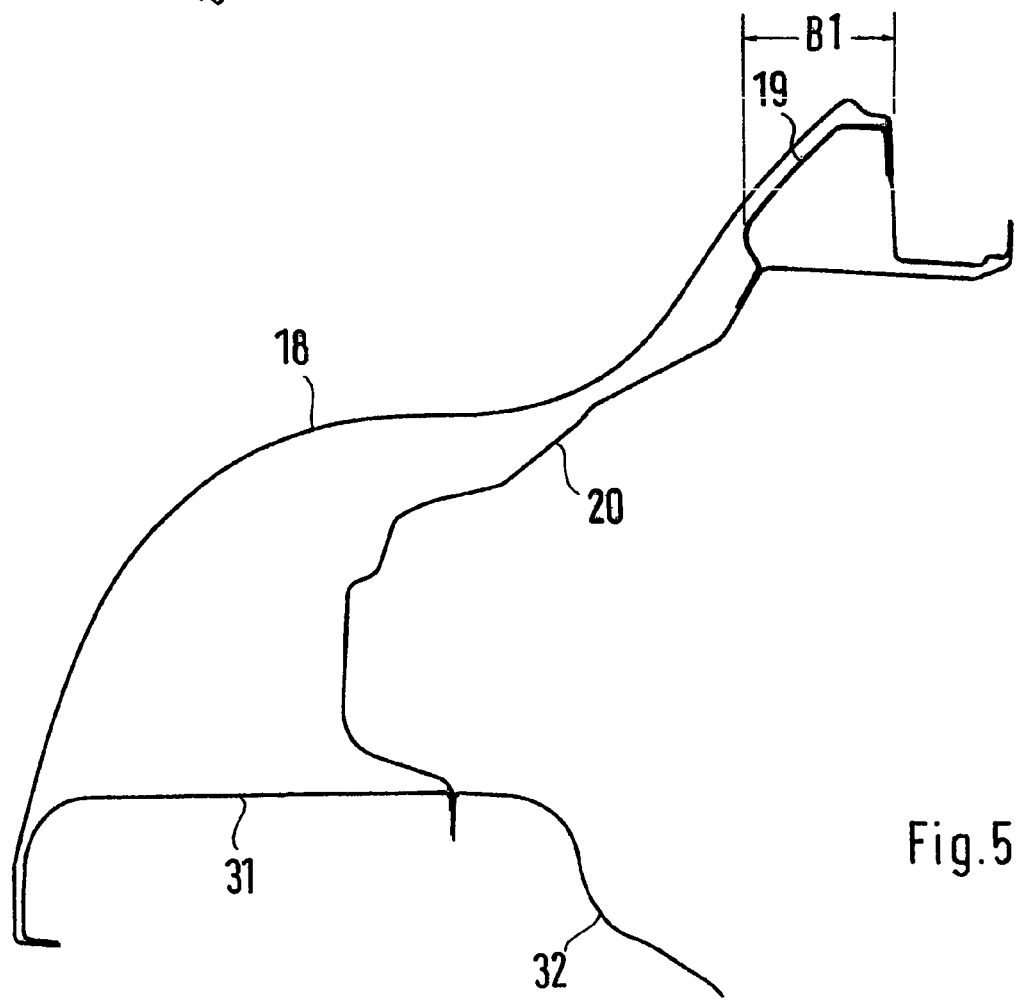
FIG. 5 is an enlarged cross-sectional view along line V-V of FIG. 2.

According to the present invention, and with reference to FIGS. 2 and 5, each lateral roof frame 10 in the area of the rearward spring strut receiving devices 15 is connected in a force-transmitting manner by a hollow support structure 16 extending in areas in the transverse direction of the vehicle to the adjoining spring strut receiving device 15 situated underneath. In the area designated generally by numeral 17 disposed in front of the rearward spring strut receiving device 15, each lateral roof frame 10 is formed by the outside of a side part 18, an intermediately connected reinforcement 19 and the inside of a side part 20 (see in particular, FIG. 4), and in this area has a width B1 (FIG. 5). The outside of the side part 18 and the reinforcement 19, on one hand, and the reinforcement 19 and the inside of the side part 20, on the other hand, each form a closed hollow support 21, 22.

For forming the hollow support structure 16, the reinforcement 19 of the lateral roof frame 10, in areas, has an L-shaped construction as viewed in a top view, with the longer leg 23 of the reinforcement 19 extending in the longitudinal direction A-A of the vehicle along the lateral roof frame 10. The shorter leg 24 of the L-shaped reinforcement 19 extends in the transverse direction B-B of the vehicle and points with its free end 25 to the exterior side of the vehicle. The shorter, transversely extending leg 24 of the L-shaped reinforcement 19 and the inside of the side part 20 situated below it form a first top-positioned hollow support 26 of the hollow support structure 16. The first hollow support 26 has a width B2 (FIG. 6) which is significantly greater than the width B1 (FIG. 5).

Figure 3:
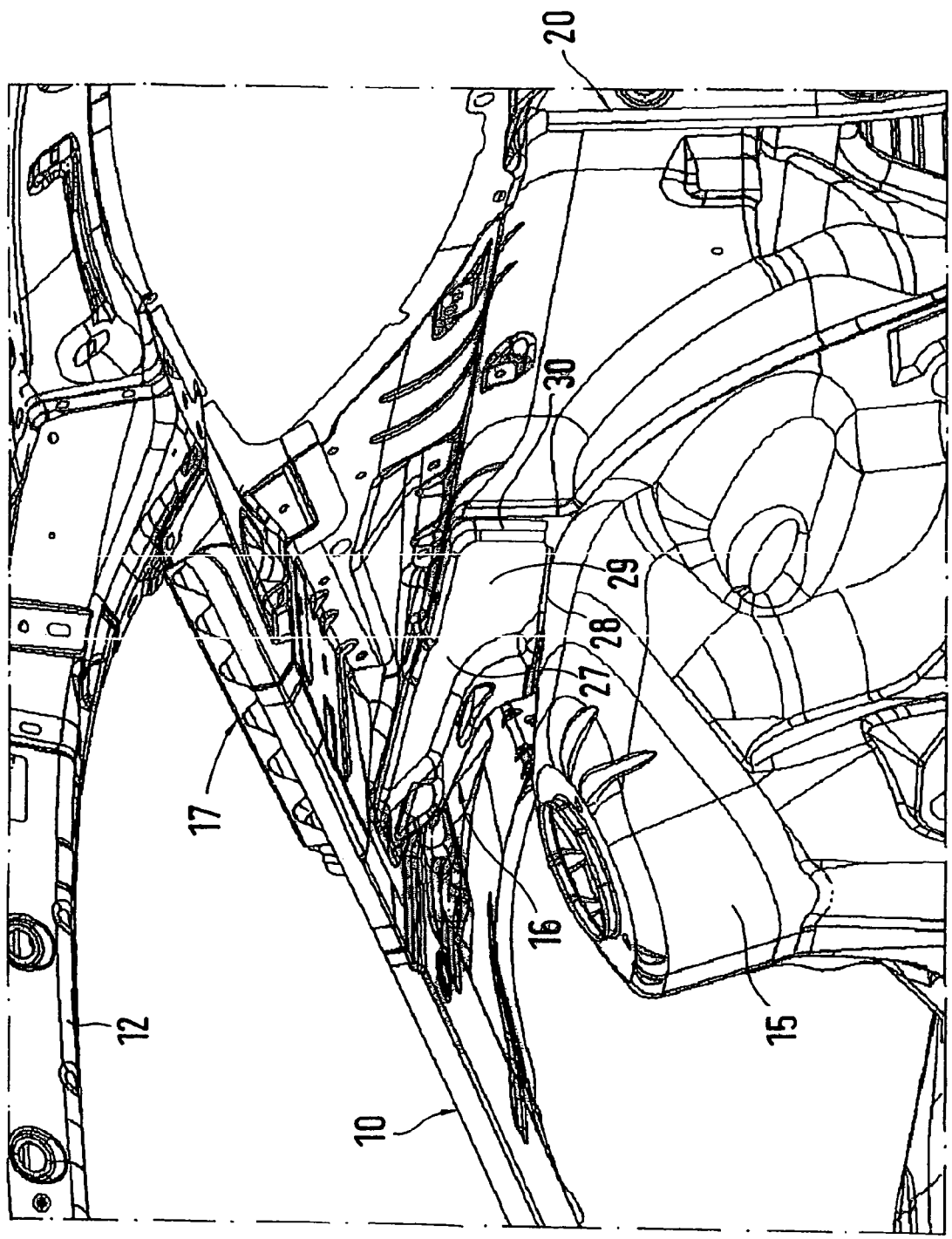
FIG. 3 is a partial perspective view diagonally from the vehicle front and inside onto the lateral area of the vehicle body structure.

The hollow support structure 16 also comprises a second hollow support situated underneath which is formed by the inside of the side part 20, an upper wall 28 of the rearward spring strut receiving device 15 and a shoe-type console 29 as seen in FIG. 3. The shoe-type console 29 is connected to the bottom side of the inside of the side part 20, to the top side of the rearward spring strut receiving device 15 and to the interior side of an upright wall section 30 of the inside of the side part 20. In the area of the linkage to the inside of the side part 20 situated above it, the shoe-type console 29 has a greater width in the transverse direction of the vehicle than in the area of the linkage to the rearward spring strut receiving device 15. In the area of the wheels, the outside of the side part 18 is connected by way of the outside of a wheel case 31 with the inside of the side part 20. Furthermore, the inside of a wheel case 32 extends away from the inside of the side part 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle body structure for a fastback-equipped passenger car, comprising oppositely arranged lateral roof frames, rearward side parts and rearward spring strut receiving devices, wherein the oppositely arranged lateral roof frames are each configured as a hollow support and are mutually locally operatively connected by transversely extending members, and each of the lateral roof frames in an area of the rearward spring strut receiving devices is operatively connected by a hollow support structure extending in a transverse direction of the vehicle, to an adjacent one of the spring strut receiving devices situated underneath each of the lateral roof frames, wherein the hollow support structure is comprised of a center reinforcement of the lateral roof frame which, in areas, as viewed in top view, has an approximately L-shaped configuration, with a longer leg of the center reinforcement extending in a longitudinal direction of the vehicle along the respective one of the lateral roof frames, and a shorter leg of the approximately L-shaped center reinforcement extends in the transverse direction and, with a free end thereof, extends toward an exterior vehicle side.

2. Vehicle body structure according to claim 1, wherein, in an area disposed in front of a respective one of rearward spring strut receiving devices, a respective one of the lateral roof frames is formed by an outside portion of one of the side parts, an intermediately connected reinforcement and an inside portion of another of the side parts.

3. Vehicle body structure according to claim 2, wherein the outside portion of the one side part, the intermediately connected reinforcement, and the inside portion of the another side part form a closed hollow support.

4. Vehicle body structure according to claim 1, wherein the shorter leg of the center reinforcement and an inside portion of one of the rearward side parts situated underneath the shorter leg comprise a first top-positioned hollow support of the hollow support structure.

5. Vehicle body structure according to claim 1, wherein the hollow support structure comprises a second hollow support comprised of another inside portion of one of the side parts, an upper wall of the respective one of the rearward spring strut receiving devices and a shoe-type console.

6. Vehicle body structure according to claim 5, wherein the shoe-type console is operatively connected at the bottom of the inside portion of the one of the side parts, to a top side of the respective rearward spring strut receiving device and to an interior side of an upright wall section of the inside portion.

7. Vehicle body structure according to claim 1, wherein a shoe-type console in an area of linkage inside one of the side parts situated thereabove has a greater width in the transverse direction than in the area of the linkage to the respective spring strut receiving device.

8. Vehicle body structure according to claim 7, wherein the shoe-type console is operatively connected at the bottom of the inside portion of the one of the side parts, to a top side of the respective rearward spring strut receiving device and to an interior side of an upright wall section of the inside portion.

9. Vehicle body structure according to claim 8, wherein, in an area disposed in front of a respective one of rearward spring strut receiving devices, a respective one of the lateral roof frames is formed by an outside portion of one of the side parts, an intermediately connected reinforcement and an inside portion of another of the side parts.

10. Vehicle body structure according to claim 9, wherein the outside portion of the one side part, the intermediately connected reinforcement, and the inside portion of the another side part form a closed hollow support.

* * * * *